March 2, 1971    C. W. VAN DUSER    3,567,352
SAFETY DEVICE FOR PERCUSSION-IGNITABLE FLASH UNITS
Original Filed Oct. 14, 1968    3 Sheets-Sheet 1

CLARENCE W. VAN DUSER
INVENTOR.

BY Milton S. Sales

Robert W. Hampton
ATTORNEYS

March 2, 1971     C. W. VAN DUSER     3,567,352
SAFETY DEVICE FOR PERCUSSION-IGNITABLE FLASH UNITS
Original Filed Oct. 14, 1968     3 Sheets-Sheet 2

CLARENCE W. VAN DUSER
INVENTOR.

BY Milton S. Sales

Robert W. Hampton
ATTORNEYS

March 2, 1971    C. W. VAN DUSER    3,567,352
SAFETY DEVICE FOR PERCUSSION-IGNITABLE FLASH UNITS
Original Filed Oct. 14, 1968    3 Sheets-Sheet 3
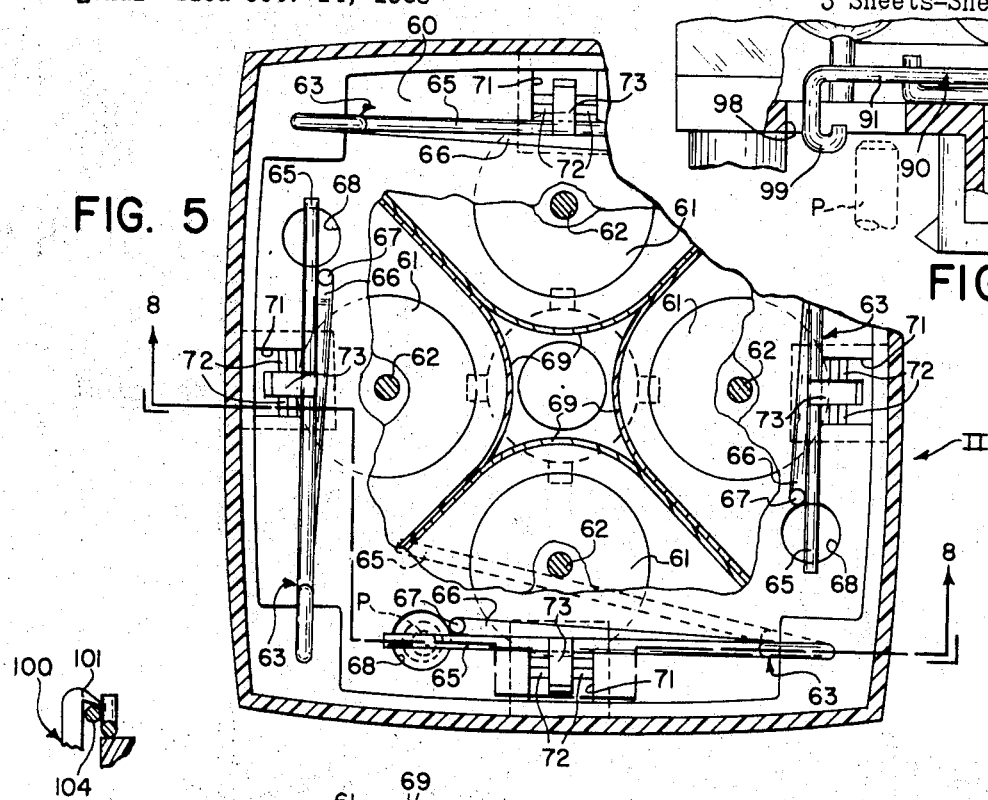
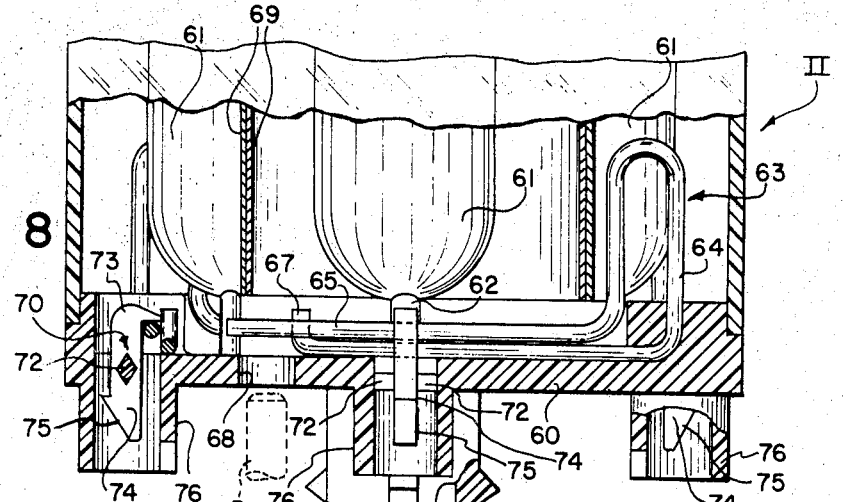
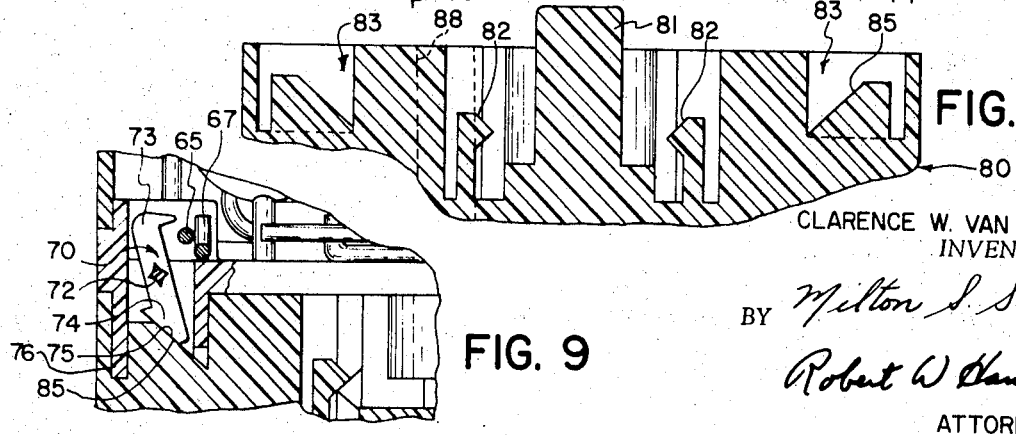
CLARENCE W. VAN DUSER
INVENTOR.
BY Milton S. Sales
Robert W. Hampton
ATTORNEYS

United States Patent Office 3,567,352
Patented Mar. 2, 1971

3,567,352
SAFETY DEVICE FOR PERCUSSION-IGNITABLE FLASH UNITS
Clarence W. Van Duser, Rochester, N.Y., assignor to Sylvania Electric Products Inc., Danvers, Mass.
Original application Oct. 14, 1968, Ser. No. 767,097.
Divided and this application May 7, 1969, Ser. No. 822,456
Int. Cl. F21k 5/02
U.S. Cl. 431—93
13 Claims

ABSTRACT OF THE DISCLOSURE

A photoflash unit having percussion-ignitable flash lamps and individual, preenergized strikers is provided with disarming latch members for each striker which prevent accidental release of the strikers. The disarming members have cam portions associable with photographic apparatus for moving the latch members to an inoperative position upon mounting of the flash unit on the apparatus. Apparatus is disclosed for cooperating during mounting of such units to arm the unit for selective release of the strikers. The disarming members are resiliently urged to their operative position so that unreleased striker elements are again disarmed upon removal of the flash unit from photographic apparatus.

CROSS-REFERENCE TO RELATED APPLICATIONS

This is a division of application Ser. No. 767,097, filed Oct. 14, 1968.

Reference is made to commonly assigned copending U.S. application Ser. No. 765,930, entitled "Multilamp Flash Unit," filed Oct. 8, 1968, in the name of David E. Beach and U.S. application Ser. No. 766,751, entitled "Percussion-Ignitable Flash Unit Having Contact-Actuatable, Preenergized Strikers and Photographic Apparatus Using Such Units," filed Oct. 11, 1968, in the names of Joseph V. Poweska and Jeffrey R. Stoneham.

BACKGROUND OF THE INVENTION

Field of the invention

The present invention relates to flash photography and in particular to percussion-ignitable photoflash units.

Description of the prior art

Recently, in order to obviate the necessity for providing an electrical source and circuit in photoflash apparatus, a percussion-ignitable photoflash lamp has been developed. One such percussion-ignitable flash lamp is disclosed in U.S. application Ser. No. 765,930, entitled "Multilamp Flash Unit" filed Oct. 8, 1968, in the name of David E. Beach. Such units in general employ lamps having an envelope containing a combustible material such as shredded zirconium foil and a combustion supporting gas such as oxygen, sealed in the envelope at a pressure of several atmospheres. A percussion-activatable ignition tube is provided at the bottom end of such lamps, with the top of the ignition tube opening into the lamp envelope and the bottom end of the tube closed and extending outside the envelope to a location suitable for percussion striking. The ignition tube contains an anvil rod coated with percussion-sensitive material such as a mixture of zirconium and fulminate; and, upon striking of the tube the material is activated and ignites the combustibles in the envelope through the open end of the ignition tube.

Another type of percussion-ignitable photoflash unit is disclosed in U.S. application Ser. No. 766,751, entitled "Percussion-Ignitable Flash Unit Having Contact-Actuatable, Preenergized Strikers and Photographic Apparatus Using Such Units," and filed Oct. 11, 1968 in the names of Joseph V. Poweska and Jeffrey R. Stoneham. The flash unit disclosed in this latter application employs percussion-ignitable flash lamps of the type described above; however, this unit includes individual preenergized striker elements for the flash lamps, which elements are selectively released by actuating mechanism in the photographic apparatus using the flash unit and move into contact with an ignition tube of their associated flash lamp to fire the flash lamp.

As disclosed in the latter mentioned application, it has been found desirable to maintain the striker elements in an energized position by dislodgably restraining elements with a protrusion on the unit base. Actuation of such restrained elements is effected by structure in photographic apparatus which moves to raise the striker free of the protrusion and the spring restoring forces of the striker then move the striker into percussion impact with its associated flash lamp. With this type of flash unit a problem exists in that the striker elements can be dislodged accidentally from the restraining means while the flash unit is not mounted on apparatus and causes unintentional firing of lamps.

SUMMARY OF THE INVENTION

The present invention is addressed to the problem outlined above and provides disarming means for preventing inadvertent actuation of the striker elements in percussion-ignitable photoflash units. Also in accordance with the present invention, a means is provided which is cooperable with photographic apparatus for rendering the disarming means of the flash unit inoperative in response to attachment of the flash unit on photographic apparatus. Further in accordance with the present invention, means are provided on the flash unit for reutrning the disarming means to an operative condition in response to detachment of the flash unit from photographic apparatus.

It is therefore an object of the present invention to provide an improved percussion-ignitable photoflash unit.

It is another object of the present invention to provide a percussion-ignitable photoflash unit, of the type having preenergized strikers, with means for preventing accidental firing while the unit is unmounted.

BRIEF DESCRIPTION OF THE DRAWINGS

The above and other objects and advantages of the present invention will become apparent to one skilled in the art from the following detailed description read in conjunction with the attached drawings wherein like reference numerals indicate like elements and wherein:

FIG. 5 is a top view of a flash unit showing another embodiment of the present invention;

FIG. 7 is a cross-sectional view of the socket of FIG. 6 taken along the line 7—7 in FIG. 6;

FIG. 8 is a cross-sectional view of the flash unit in FIG. 5 taken along the lines 8—8 in FIG. 5;

FIG. 9 is a cross-sectional view of portions of the flash unit shown in FIG. 5 mounted in the socket shown in FIGS. 6 and 7;

FIG. 10 is a partial cross-sectional view showing another flash unit feature which can be incorporated in accordance with the present invention; and FIG. 11 is a view of a modified retaining member which can be used in accordance with the present invention.

DETAILED DESCRIPTION OF PREFERRED EMBODIMENTS

Figure 1:
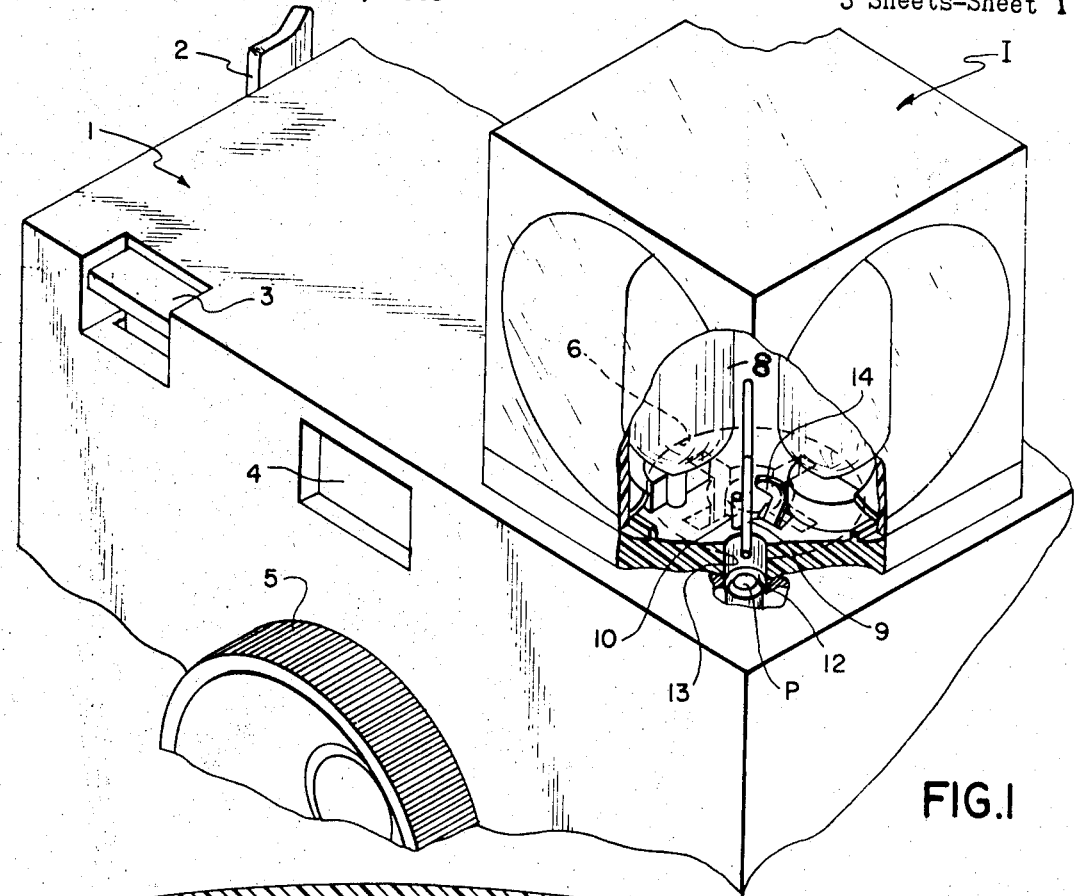
FIG. 1 is a perspective view showing one flash unit and photographic apparatus, in this instance a camera, which embody the present invention.

In FIG. 1 one embodiment of the present invention is shown schematically as employed on a photographic camera 1. The camera 1 is of known type and the camera film advance lever 2, shutter release lever 3, viewfinder 4 and picture-taking opening 5 can be seen in FIG. 1. Because photographic cameras having means to successively index and ignite received flash units are well known in the art, the present description will be directed to elements of such apparatus which form a part of or cooperate more directly with the present invention, particular elements not shown or described being understood to be selectable from those known in the art.

In FIG. 1 it can be seen that the camera 1 also includes a socket 6 in which is mounted a flash unit I with percussion-ignitable flash lamps 8 and spring striker elements 9 dislodgably retained in an energized condition by lugs 10 in a manner described in more detail in the forementioned Poweska and Stoneham application. It can be seen that the housing of camera 1 also includes an actuating opening 12 which is aligned with an access opening 13 in the flash unit 7 when the flash unit has been received and indexed by the socket 6. A portion of the disarming means 14 of the present invention can also be seen in FIG. 1 moved to its inoperative position which will be subsequently described.

Figure 2:
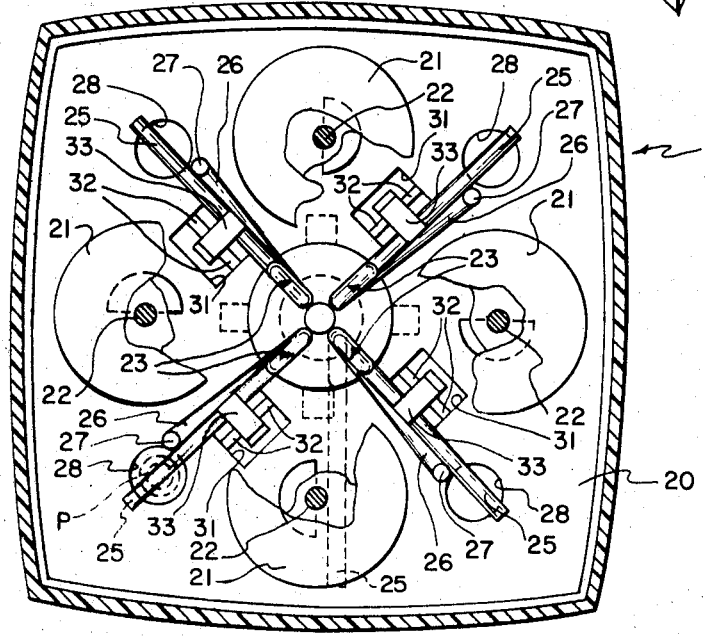
FIG. 2 is a top view in section of a flash unit employing one embodiment of the present invention.
Figure 3:
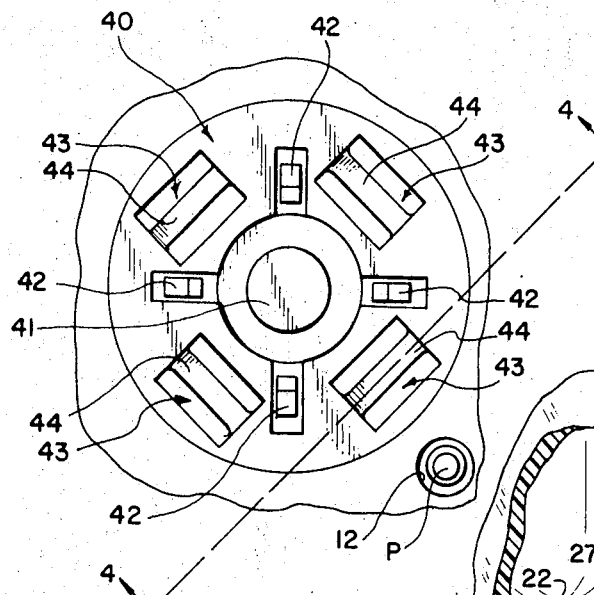
FIG. 3 is a top view of a socket adapted for use with the flash unit of FIG. 2.
Figure 4:
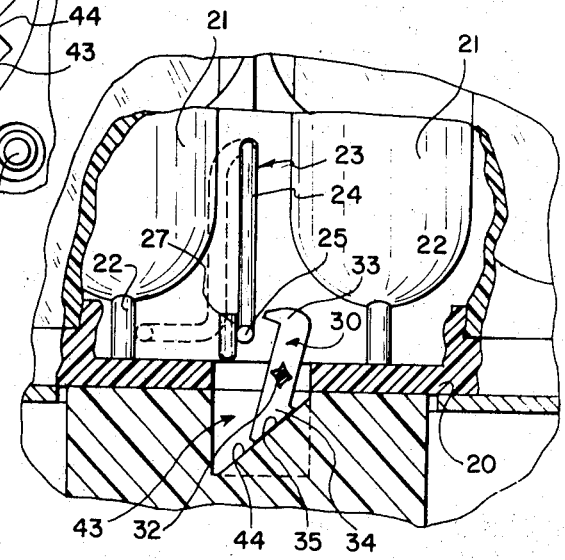
FIG. 4 is a sectional view taken along line 4—4 in FIG. 3 with the flash unit in FIG. 2 mounted on the socket shown in FIG. 3 and with portions removed for illustration.

Referring now to FIGS. 2—4 the specific construction and cooperation of one embodiment of camera socket and flash unit of the present invention will be described.

In FIG. 2 the flash unit I can be seen to comprise a base 20 on which are mounted percussion-ignitable flash lamp 21 with ignition tubes 22 of the type described in more detail in the aforementioned Beach application. Also mounted on the base 20 in the flash unit are striker springs 23 which each include a U-shaped torsion drive portion 24 extending upwardly from the base in the central portion of the unit, a restraining arm 26 and striker element 25. The restraining arm 26 is secured to the base 20 and the striker element 25 is dislodgably restrained in a stressed condition by an upwardly restraining portion 27 of the restraining arm 26. The spring restoring forces in the inverted U-shaped portions 24 urge the striker elements 25 towards the ignition tubes 22 of their associated flash lamps 21. An access site 28 is provided in the base 20 beneath each of the striker elements 25 in their energized position so that an actuator element P can move from photographic apparatus and upwardly dislodge the striker element 25 from its restraint by portion 27. The striker elements 25, when so released, are moved into percussion impact with a respective ignition tube by restoring spring forces and ignite the flash lamp 21 associated therewith.

In accordance with a novel feature of the present invention, a disarming member 30 is provided for each striker element 25. Each disarming member 30 is located in an opening 31 in the base 20 and resilient webs 32 located in the openings 31 connect each member 30 to the base. The members 30 each have a latching portion 33 within the flash unit I which is constructed and located to hold striker elements 25 from upward movement over their restraining portions 27. The webs 32 resiliently urge the latching portions 33 to an operative latching position over the strikers as shown in FIG. 2. Each disarming member 30 also includes a cam arm 34 which is located on the opposite side of the base 20 from the latching portion 33 and is constructed with a cam surface 35 adapted to be contacted by mating structure on photographic apparatus when the flash unit is mounted on such apparatus.

Referring now to FIG. 3 a socket 40 which is adapted to cooperate with the flash unit I described above is shown. The socket 40 has a central stabilizing stud 41 adapted to mate with a post of the type shown in FIG. 8 on the bottom of the base 20 and resilient retaining fingers 42 which are adapted to detachably retain cooperating structure of flash unit I in the socket. It can be seen that the socket 40 also is provided, in accordance with the present invention, with a plurality of depressions 43 each having a ramped surface 44 adapted to cooperate with the cam surface 35 on cam arm 34 of a disarming member 30.

By referring to FIG. 4 it can be seen that when the flash unit I is inserted into socket 40 the contact between surface 35 of latch member 30 and ramped surface 44 of socket depression 43 cause the latch member 30 to pivot clockwise, as viewed in FIG. 4, against the bias of webs 32. This rotation of the members 30 causes latching portions 33 to move away from striker elements 27 so that the elements 25 can be selectively moved upward and dislodged from restraint of portions 25 by actuation of element P in the associated photographic apparatus.

It will be appreciated that upon removal of the flash unit I from the socket 40, the resilient restoring forces of webs 32 will return the latch members 30 to their original latched positions shown in FIG. 2 and that any unreleased striker elements 25 will again be disarmed by the latch portions 33 moving thereover. In the embodiments disclosed herein the webs 32 are formed as integral portions of the base 20 and have a diamond-shaped cross-section; however, it will be appreciated that separate elements can be used to mount and bias the disarming member on the flash unit base.

Referring now to FIGS. 5—9, another embodiment II of flash unit and socket incorporating the present invention will be described. In FIG. 5 it can be seen that flash unit II is similar to the flash unit I in that flash lamps 61 having ignition tubes 62 are mounted in a circular arrangement on base 60 with individual reflectors 69 for each flash lamp 62. In this embodiment, however, the striker springs 63 are mounted along the outer walls of the flash unit with the torsion spring portions 64 extending upwardly in corners of the unit. Again, the springs 63 have striking elements 65 and a restraining arm 66 with upwardly extending portions 67 which hold the striker elements 65 in a position urged by torsion spring portions 64 toward the ignition tubes 62, and over access sites 68. The striker elements 65 are releasable upon upward movement over portions 67 by a suitable plunger P entering the unit II at an indexed access site 68.

The flash unit II also is provided with disarming members 70 which are supported in openings 71 by resilient webs 72. Again, the disarming members 70 include latch portions 73 extending over energized striking elements 65 and a cam arm 74 with a surface 75. It will be noted that in this embodiment the base 60 is provided with downwardly extending skirts 76 which protectively surround the cam portions 74 of the disarming members 70.

Figure 6:
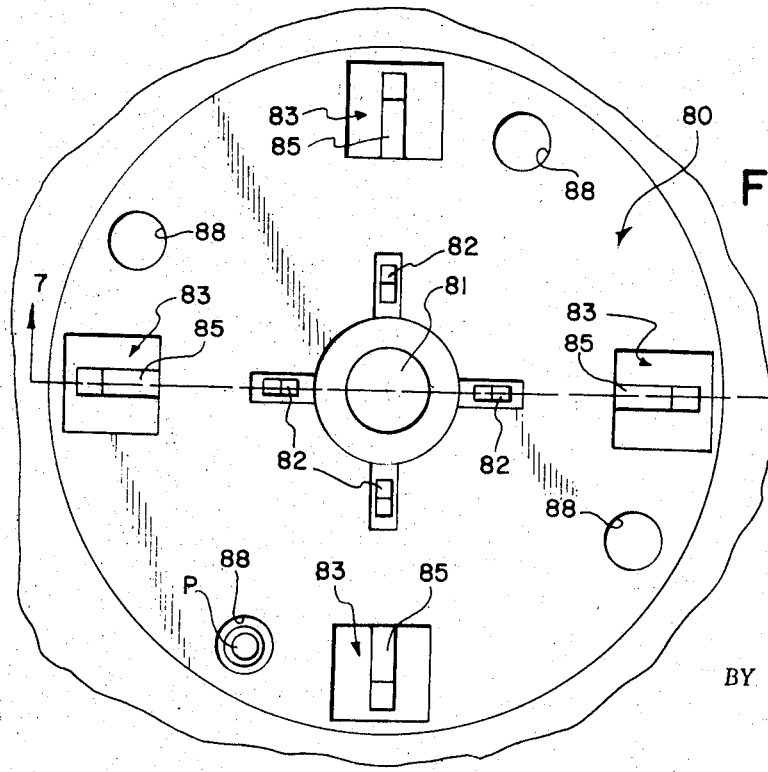
FIG. 6 is a top view of a socket adapted to receive the flash unit shown in FIG. 5.

The socket 80 which cooperates with the flash unit II is shown in FIGS. 6 and 7 and can be seen to include a control and stabilizing stud 81 and retaining fingers 82. The socket 80 is also provided with depressions 83 for seating lower portions of disarming members 70 and their protective skirts 76 and have ramped surfaces 85 which, upon insertion of a flash unit II, are adapted to contact surface 75 of cam arm 74 and rotate the disarming members 70 to an inoperative position as shown in FIG. 9. In this socket embodiment actuating openings 88 are provided in a position to be aligned with the access of sites 68 in the flash unit base when the flash unit is mounted on the socket.

It will be appreciated that when the unit II is inserted in socket 80, the surfaces 85 of the socket contact and rotate the disarming members 70 to an inoperative position as shown in FIG. 9 and that upon removal of the flash unit II from the socket 80 the resilient webs 72 return the disarming members 70 to their operative position with latch portions 73 retaining the striking elements 65 from upward movement and release.

FIG. 10 shows another embodiment in which the spring 90 has striking element 91 formed with a downwardly extending portion 99 which is located in an enlarged access site 98 so as to be readily accessible from the flash unit exterior. Suitable sensing mechanism can be provided on photographic apparatus to detect the presence of an energized striker element and hence the condition of the related lamp. Upon actuation of the striker element 90, the downwardly extending portion 99 also serves to control the plane of firing movement of striker element 91 as it rides on the planar surface of the unit base.

FIG. 11 discloses disarming member 100 which has a modified latching surface 101 that can be provided to obtain a more positive retention of striker elements 104. In FIG. 11 it can be seen that the surface 101 is formed with a slightly negative angle to provide increased safety against accidental release of a striker 104. In this manner an increased clearance also can be provided between the latch portion 101 and the striker element 104 to facilitate return of the disarming memebr to its proper operative position after insertion and removal from a socket.

The invention has been described in detail with particular reference to preferred embodiments thereof but it will be understood that variations and modifications can be effected within the spirit and scope of the invention.

I claim:

1. In combination with a photoflash unit of the type having a percussion-ignitable flash lamp and striker element mounted for movement into percussion impact with said flash lamp and releasably restrained in a spring-energized condition at a location spaced from said flash lamp, the improvement comprising disarming means for preventing release of said striker element from said energized condition, wherein flash unit is for use with photographic apparatus and includes means, operatively associated with said disarming means and associable with photographic apparatus, for disabling said disarming means automatically when said unit is mounted on photographic apparatus.

2. The invention defined in claim 1 further comprising means for reenabling said disarming means in response to disassociation of said unit from photographic apparatus.

3. The invention defined in claim 2 wherein said disarming means includes a movable latch member which is resiliently biased to a position retaining said striker element in said energized condition.

4. The invention defined in claim 3 wherein said disarming means comprises an extension of said latch member having a cam surface located and shaped to cooperate with structure on photographic apparatus and move said latch member away from said striker.

5. For use with photographic apparatus, a photoflash unit comprising:
(a) a base;
(b) a percussion-ignitable flash lamp mounted on said base;
(c) a spring-energized striker element mounted on said unit at a location for movement into percussion impact with said flash lamp, said striker element being releasably restrained in a position spaced from said flash lamp;
(d) means located on said unit for preventing release of said striker element; and
(e) means associated with release preventing means and operatively associable with photographic apparatus for rendering said release preventing means inoperative automatically when said unit is mounted on photographic apparatus.

6. The invention defined in claim 5 further comprising means for rendering said release preventing means reoperative upon disassociation with photographic apparatus.

7. The invention defined in claim 6 wherein said release preventing means includes a latching element, movable between an operative position positively retaining said striker element and an inoperative position out of the path of said striker element.

8. The invention defined in claim 7 wherein said means for rendering said release preventing means inoperative includes a motive element located for contact by structure of photographic apparatus with which said unit is used and operatively associated with said latching element to move said latching element from said operative position to said inoperative position in response to contact by the structure of the apparatus with which the flash lamp is used.

9. The invention defined in claim 8 and latch element and said motive element are portions of an integral member which is resiliently coupled to said unit in a manner urging said latch member to said operative position.

10. For use with photographic apparatus, a photoflash unit comprising:
(a) a base;
(b) a percussion-ignitable flash lamp mounted on said base;
(c) a spring-energizable striker mounted on said base at a location for movement into percussion impact with said flash lamp;
(d) means for dislodgable restraining said striker in an energized condition spaced from said flash lamp;
(e) means, supported on said base and operatively positioned in relation to said striker, for positively retaining said striker in said energized condition; and
(f) means associated with said retaining means and associable with photographic apparatus for moving said retaining means from said operative position with said striker automatically when said unit is mounted on photographic apparatus.

11. The invention defined in claim 10 further comprising means for returning said retaining means into said operative position with said striker in response to disassociation of said flash unit from photographic apparatus.

12. The invention defined in claim 11 wherein said retaining means, said removing means and said returning means are formed as an integral portion of said base.

13. The invention defined in claim 12 wherein said integral base portion includes a latch portion movable between a retaining and released position, a motive portion located and shaped for cooperation with photographic apparatus to move said latch portion to said released position and a resilient web connected to the said base.

References Cited

UNITED STATES PATENTS

| | | | |
|---|---|---|---|
| 2,024,225 | 12/1935 | Igari | 431—93 |
| 3,439,992 | 4/1969 | Shaffer et al. | 431—93 |

FOREIGN PATENTS

| | | | |
|---|---|---|---|
| 813,360 | 5/1959 | Great Britain | 431—269 |

EDWARD J. MICHAEL, Primary Examiner